(12) United States Patent
Song

(10) Patent No.: US 12,552,462 B2
(45) Date of Patent: Feb. 17, 2026

(54) VEHICLE A-PILLAR GARNISH STRUCTURE HAVING NO CLIP ESCAPE HOLE

(71) Applicants: Hyundai Motor Company, Seoul (KR); Kia Corporation, Seoul (KR)

(72) Inventor: Han-Seok Song, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 382 days.

(21) Appl. No.: 18/300,891

(22) Filed: Apr. 14, 2023

(65) Prior Publication Data

US 2024/0199127 A1    Jun. 20, 2024

(30) Foreign Application Priority Data

Dec. 16, 2022   (KR) .......................... 10-2022-0176467

(51) Int. Cl.
*B62D 25/04*    (2006.01)
*B60R 13/02*    (2006.01)

(52) U.S. Cl.
CPC ............ *B62D 25/04* (2013.01); *B60R 13/025* (2013.01)

(58) Field of Classification Search
CPC .............................. B62D 25/04; B60R 13/025
See application file for complete search history.

(56) References Cited

U.S. PATENT DOCUMENTS

| 4,699,419 A | 10/1987 | Kawase et al. | |
|---|---|---|---|
| 8,398,157 B2 * | 3/2013 | Marquette | B62D 25/04 296/193.06 |
| 10,723,306 B2 * | 7/2020 | Komura | B21D 37/10 |
| 2010/0060037 A1 * | 3/2010 | Terai | B60J 1/10 296/193.06 |
| 2024/0101195 A1 * | 3/2024 | Kim | B62D 23/005 |

* cited by examiner

*Primary Examiner* — Aaron L Lembo
(74) *Attorney, Agent, or Firm* — Slater Matsil, LLP

(57) ABSTRACT

An embodiment A-pillar garnish structure includes an A-pillar portion defining an A-pillar inner space using a front inner upper panel and a side outer panel, a garnish fixed to the side outer panel using a mounting clip passing through the side outer panel, wherein the garnish is configured to provide a design of an exterior appearance of the A-pillar portion, and a vehicle-frame reinforced panel defining a mounting clip separation space together with the side outer panel of the A-pillar portion in such a manner as to have a closed cross-section structure, wherein the mounting clip does not contact the vehicle-frame reinforced panel.

20 Claims, 5 Drawing Sheets

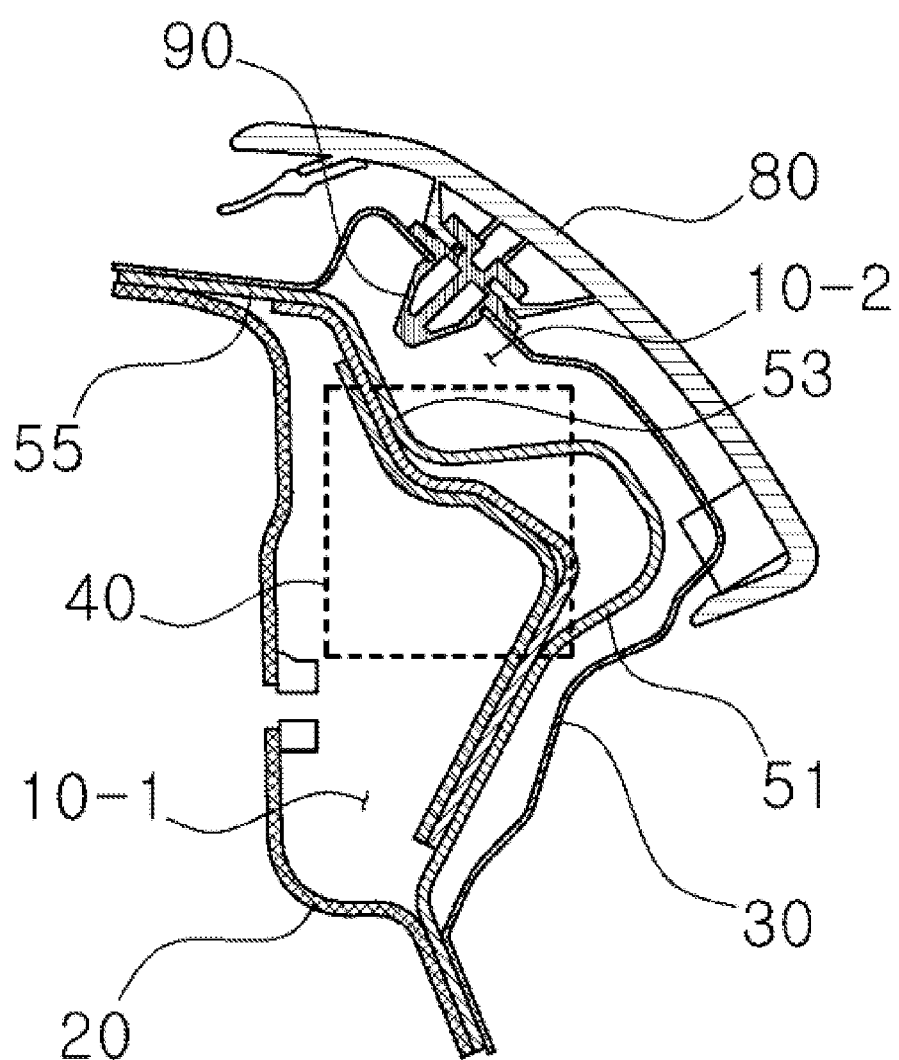

VEHICLE A-PILLAR GARNISH STRUCTURE HAVING NO CLIP ESCAPE HOLE

CROSS-REFERENCE TO RELATED APPLICATIONS

This application claims the benefit of Korean Patent Application No. 10-2022-0176467, filed on Dec. 16, 2022, which application is hereby incorporated herein by reference.

TECHNICAL FIELD

The present disclosure relates to an A-pillar garnish structure.

BACKGROUND

Usually, a vehicle A-pillar portion is also referred to as a front pillar portion. The vehicle A-pillar portion suppresses the occurrence of vibration while a vehicle travels and suppresses twisting of a vehicle frame when the vehicle turns sharply. The vehicle A-pillar portion serves to absorb collision energy occurring when a vehicle collision takes place and to prevent the collision energy from being transferred to a vehicle occupant compartment.

Furthermore, the A-pillar portion is used as a portion of a vehicle frame to which an outer-plate garnish serving to increase design competitiveness on a per-vehicle type basis is attached. Thus, in recent years, the A-pillar portion has contributed to reflecting a design trend on a per-vehicle type basis.

For this purpose, an A-pillar garnish structure that includes the A-pillar portion on which a garnish is available is configured with the outer-plate garnish, a mounting clip, and a vehicle-frame reinforced panel. The outer-plate garnish is fastened to a side outer panel (SIDE OTR PNL) using a mounting clip, thereby achieving a design of an exterior appearance of the A-pillar portion. The vehicle-frame reinforced panel is mounted inside a space between a front inner upper panel (FR INR UPR PNL) and a side outer panel, thereby ensuring rigidity of the A-pillar portion.

Therefore, the A-pillar garnish structure can increase the design competitiveness by utilizing a design and a shape of the outer-plate garnish. Moreover, the A-pillar garnish structure can comply with a 40% offset test and small overlap collision regulations because rigidity of the vehicle-frame reinforced panel is ensured.

However, the A-pillar garnish structure requires that a clip escape hole be drilled in the vehicle-frame reinforced panel due to the mounting clip that is used to attach the outer-plate garnish.

As an example, in a case where the vehicle-frame reinforced panel is configured with a roof side reinforced outer panel (REINF-ROOF SIDE OTR PNL), a first roof pillar outer reinforced upper panel (REINF-FR PLR OTR UPR PNL NO. 1), and a second roof pillar outer reinforced upper (REINF-FR PLR OTR UPR PNL NO. 2), the clip escape hole has to be drilled in the roof side reinforced outer panel and the first roof pillar outer reinforced upper panel because they structurally face the mounting clip. The clip escape hole decreases rigidity of the vehicle-frame reinforced panel.

Therefore, when a small overlap collision evaluation test is conducted, there is a high likelihood that a portion in the vicinity of the clip escape hole will be fractured. The vehicle-frame reinforced panel can ensure collision safety performance by reducing this likelihood. However, in this case, a high-rigidity material of the vehicle-frame reinforced panel has to be used, and the thickness thereof has to be increased. Accordingly, the manufacturing cost and the weight of the vehicle-frame reinforced panel are increased.

That is, the hole has to be drilled in the vehicle-frame reinforced panel of the A-pillar garnish structure. This hole drilling causes degradation in collision performance and in noise, vibration, and harshness (NVH) performance. Prevention of this degradation requires the use of the high-rigidity material of the vehicle-frame reinforced panel and the increase in the thickness thereof, thereby causing an increase in manufacturing cost and weight.

In addition, outside noise, road noise, and wind noise occurring during vehicle traveling can be transferred to the vehicle occupant compartment through the clip escape hole in the A-pillar garnish structure, and thus, the NVH performance is further degraded.

SUMMARY

The present disclosure relates to an A-pillar garnish structure. Particular embodiments relate to a vehicle having an A-pillar garnish structure on which an outer-plate garnish is available without a clip escape hole causing a decrease in rigidity of a vehicle-frame reinforced panel.

An embodiment of the present disclosure provides a vehicle A-pillar garnish structure having no clip escape hole. The vehicle A-pillar garnish structure includes a vehicle-frame reinforced panel of which a portion facing a mounting clip used to attach a garnish for achieving design competitiveness does not have a drilled clip escape hole, and thus ensures collision safety performance by maintaining rigidity of a reinforced panel, resulting in passing a small overlap collision evaluation test. Particularly, the vehicle-frame reinforced panel of the vehicle A-pillar garnish structure has the shape of the letter "W," thereby eliminating the need to drill the clip escape hole. Accordingly, a value of the fully plastic moment is ensured at approximately the same level as when a portion in which the clip escape hole is formed is present. Moreover, a reduction in manufacturing cost and weight can be achieved.

According to an embodiment of the present disclosure, there is provided an A-pillar garnish structure including an A-pillar portion connecting an engine room and a roof to each other on left and right sides of a vehicle and forming an A-pillar inner space, using a front inner upper panel and a side outer panel, a garnish fixed to the side outer panel using a mounting clip passing through the side outer panel and achieving a design of an exterior appearance of the A-pillar portion, and a vehicle-frame reinforced panel provided inside the A-pillar inner space in such a manner as to have a reinforced closed cross-sectional structure and forming a mounting clip separation space, together with the side outer panel, and an end portion of the mounting clip protruding out of the side outer panel being kept from being in contact with the reinforced closed cross-sectional structure inside the mounting clip separation space.

As a desirable embodiment, the vehicle-frame reinforced panel is configured with a roof side reinforced outer panel, a form is formed in the shape of a groove on a form configuration portion protruding from a welding flange in the roof side reinforced outer panel, respective cross sections in a longitudinal direction of the form and the form configuration portion form a stepped structure in which the mounting clip separation space is enlarged, and a plurality of the forms are formed and arranged in a zigzag fashion in a transverse direction of the form configuration portion.

As a desirable embodiment, a first roof pillar outer reinforced upper panel having a relatively short length is joined to the roof side reinforced outer panel, a rigidity reinforcing portion that is connected to the form configuration portion by surface matching welding is formed on the first roof pillar outer reinforced upper panel, and the surface matching welding is performed on the form in a state where the rigidity reinforcing portion is surface-matched, in the shape of the letter "W," with the form configuration portion.

As a desirable embodiment, a second roof pillar outer reinforced upper panel having a relatively short length is joined to the first roof pillar outer reinforced upper panel, a rigidity reinforcing cross-sectional portion that is connected by welding is formed on the second roof pillar outer reinforced upper panel, and the rigidity reinforcing cross-sectional portion additionally reinforces a cross section of the rigidity reinforcing portion of the first roof pillar outer reinforced upper panel.

According to another embodiment of the present disclosure, there is provided a vehicle including an A-pillar garnish structure, in which an A-pillar inner space in an A-pillar portion is formed using a front inner upper panel and a side outer panel, a reinforced closed cross-sectional structure formed using a roof side reinforced outer panel, a first roof pillar outer reinforced upper panel, and a second roof pillar outer reinforced upper panel forms a mounting clip separation space, together with the side outer panel, inside the A-pillar inner space, a stepped structure of a form configuration portion and a form that are formed on the roof side reinforced outer panel keeps an end portion of a mounting clip, passing through the side outer panel and positioned inside the mounting clip separation space in such a manner as to fix a garnish, from being in contact with the reinforced closed cross-sectional structure.

As a desirable embodiment, the A-pillar garnish structure is provided on each of the left and right sides of the vehicle where the A-pillar portion connects the engine room and the roof to each other.

The vehicle A-pillar garnish structure having no clip escape hole according to embodiments of the present disclosure achieves the following operations and effects.

Firstly, the vehicle-frame reinforced panel in the shape of the letter "W" makes the outer-plate garnish available on the vehicle A-pillar garnish structure without the clip escape hole causing a decrease in the rigidity of the reinforced panel. Thus, the design competitiveness can be ensured with the outer-plate garnish. Secondly, a decrease in rigidity due to the clip escape hole does not take place, and thus, there is no need to reinforce the vehicle-frame reinforced panel by using a high-rigidity material of the vehicle-frame reinforced panel and by increasing the thickness thereof. Thus, the cost of the vehicle A-pillar garnish structure and the weight thereof are reduced. Thirdly, since the vehicle-frame reinforced panel has the shape of the letter "W," the value of the fully plastic moment is ensured at approximately the same level as when the portion in which the clip escape hole is formed is present. Then, when the small overlap collision evaluation test is conducted, it is possible to ensure the collision safety performance. Fourthly, the clip escape hole is not drilled in the vehicle-frame reinforced panel. Outside noise, road noise, and wind noise occurring during traveling can be blocked from being transferred to a vehicle occupant compartment through the clip escape hole, and thus, noise, vibration, and harshness (NVH) performance can be greatly improved.

BRIEF DESCRIPTION OF THE DRAWINGS

FIGS. 2A and 2B are cross-sectional views illustrating the A-pillar garnish structure according to embodiments of the present disclosure.

DETAILED DESCRIPTION OF ILLUSTRATIVE EMBODIMENTS

Embodiments of the present disclosure are in detail described below with reference to the accompanying drawings. The embodiments are exemplary and may be practiced in various forms by a person of ordinary skill in the art to which the present disclosure pertains. Therefore, the present disclosure is not limited to the embodiments described below.

Figure 1:
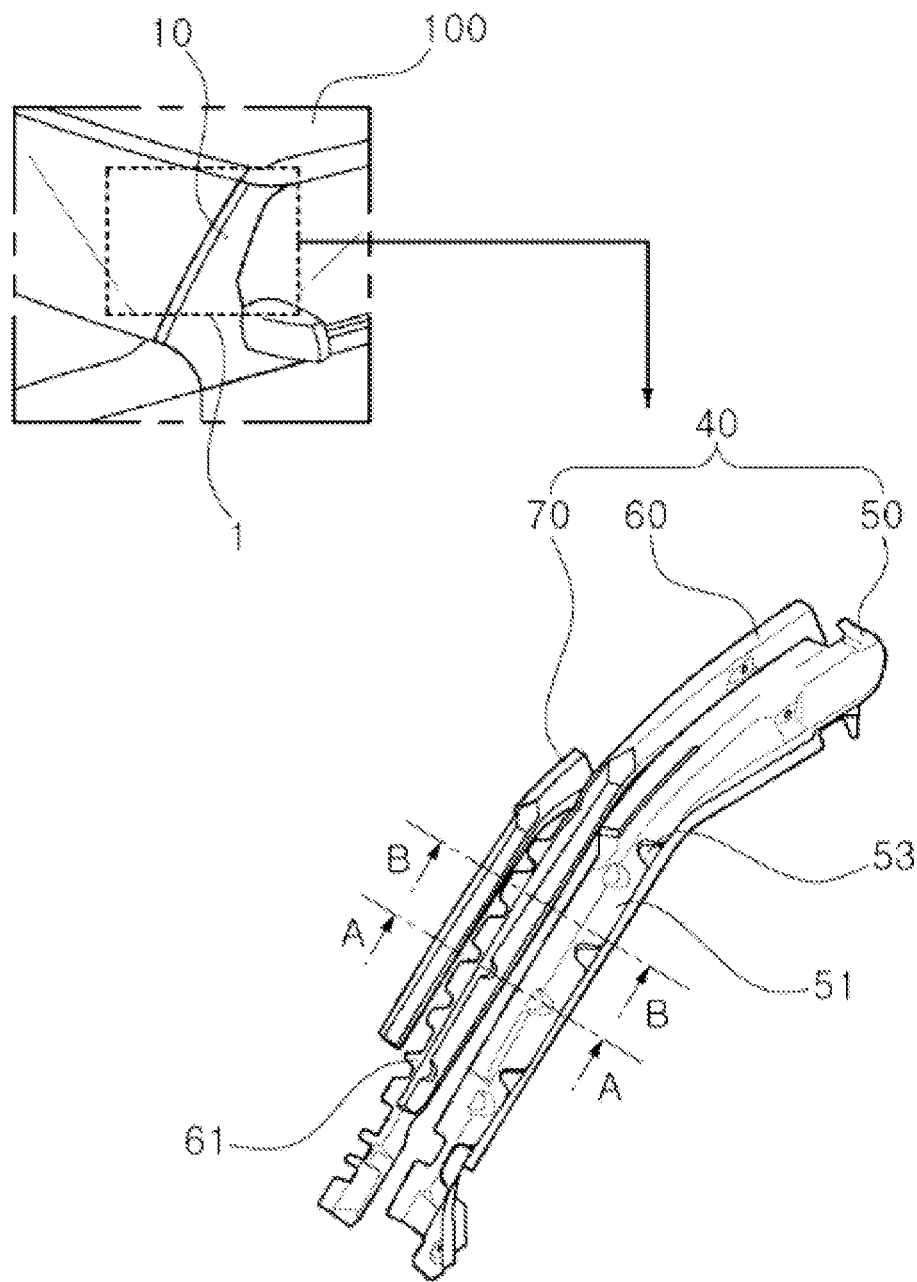
FIG. 1 is a configuration view illustrating that an A-pillar garnish structure having no clip escape hole according to embodiments of the present disclosure is available on a vehicle.
Figure 2B:
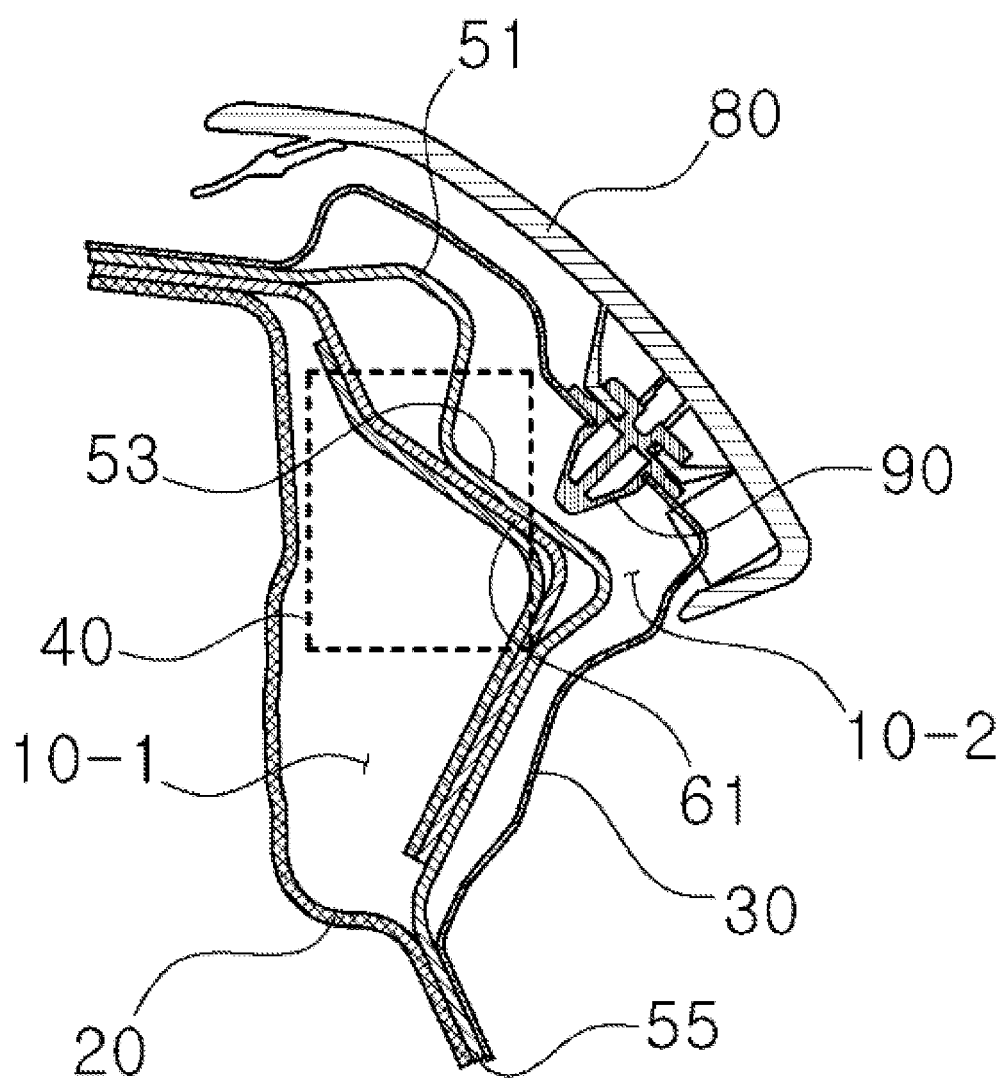

FIGS. 1, 2A, and 2B are views illustrating a configuration of an A-pillar garnish structure 1 that finds application in an A-pillar portion 10 of a vehicle 100.

With reference to FIG. 1, the A-pillar garnish structure 1 is configured with the A-pillar portion 10, extending from an engine room to a vehicle roof, that is positioned on right and left front lateral side portions of the vehicle 100. A vehicle-frame reinforced panel 40 is mounted inside an A-pillar inner space 10-1 (refer to FIGS. 2A and 2B) in the A-pillar portion 10.

As an example, the vehicle-frame reinforced panel 40 is configured with a roof side reinforced outer panel 50, a first roof pillar outer reinforced upper panel 60, and a second roof pillar outer reinforced upper panel 70. These panels are fixed to each other by welding. Thus, the vehicle-frame reinforced panel 40 has an integral structure.

Since the roof side reinforced outer panel 50, the first roof pillar outer reinforced upper panel 60, and the second roof pillar outer reinforced upper panel 70 are welded together to form an integral structure of the vehicle-frame reinforced panel 40, the integral structure is a closed cross-sectional structure. This closed cross-sectional structure means a reinforced closed cross-sectional structure. For this reason, the closed cross-sectional structure is hereinafter described as the reinforced closed cross-sectional structure.

Particularly, a form configuration portion 51 on which forms 53 are formed in a zigzag pattern is formed on an inner portion of a welding flange 55 of the roof side reinforced outer panel 50. The roof side reinforced outer panel 50 is joined to a surface of one side of a front inner upper panel 20 by welding the welding flange 55 thereon.

Therefore, an integral structure that uses the roof side reinforced outer panel 50 and a closed cross-sectional surface formation portion 21 (refer to FIG. 3) of the front inner upper panel 20 may be formed as the reinforced closed cross-sectional structure that uses the vehicle-frame reinforced panel 40 inside the A-pillar inner space 10-1.

Then, the first roof pillar outer reinforced upper panel 60 has a rigidity reinforcing portion 61 in the shape of the letter "W." Through the forms 53, the rigidity reinforcing portion 61 that uses the forms 53 is joined to a surface of one side of the roof side reinforced outer panel 50 by being welded thereon.

In addition, the second roof pillar outer reinforced upper panel 70 has a rigidity reinforcing cross-sectional portion 71, and the rigidity reinforcing cross-sectional portion 71 is joined to a surface of one side of the first roof pillar outer reinforced upper panel 60 by being welded thereon. Thus, additional reinforcing of a cross section of the rigidity reinforcing portion 61 is realized by the rigidity reinforcing cross-sectional portion 71.

With reference to FIGS. 2A and 2B, which are cross-sectional views taken along lines A-A and B-B of FIG. 1, respectively, the roof side reinforced outer panel 50, the first roof pillar outer reinforced upper panel 60, and the second roof pillar outer reinforced upper panel 70 that comprise the vehicle-frame reinforced panel 40 have a bent shape. Due to the bent shape, the reinforced closed cross-sectional structure of the vehicle-frame reinforced panel 40 is formed inside the A-pillar inner space 10-1 in the A-pillar portion 10.

As an example, the form configuration portion 51 protrudes in a longitudinal direction (that is, in a width direction of the panel) from the welding flange 55, and thus the roof side reinforced outer panel 50 has a cross section protruding in the transverse direction. Moreover, the rigidity reinforcing portion 61 is bent in the longitudinal direction (that is, in the width direction of the panel), and thus, the first roof pillar outer reinforced upper panel 60 has a cross section formed with a line smoothly curved in the longitudinal direction. Moreover, the rigidity reinforcing cross-sectional portion 71 is bent in the longitudinal direction (that is, in the width direction of the panel), and thus, the second roof pillar outer reinforced upper panel 70 has a cross section formed with a line smoothly curved in the longitudinal direction as does the first roof pillar outer reinforced upper panel 60.

Therefore, the roof side reinforced outer panel 50 causes a contour of the reinforced closed cross-sectional structure, formed by the roof side reinforced outer panel 50 and the front inner upper panel 20, to be curved in such a manner as to have a protruding structure. Moreover, the first roof pillar outer reinforced upper panel 60 and the second roof pillar outer reinforced upper panel 70 divide an inner space in the reinforced closed cross-sectional structure into two spaces in such a manner as to have a smoothly-curved-line structure under the roof side reinforced outer panel 50.

In addition, in FIGS. 2A and 2B, the A-pillar portion 10 is configured with the front inner upper panel 20 and the side outer panel 30 that form the A-pillar inner space 10-1. A garnish 80 that comprises the A-pillar garnish structure 1 is mounted on a side outer panel 30 using a mounting clip 90.

Through this A-pillar structure, the vehicle-frame reinforced panel 40, having the reinforced closed cross-sectional structure of the vehicle-frame reinforced panel 40, is built into the A-pillar inner space 10-1, thereby reinforcing the rigidity of the A-pillar portion 10. The garnish 80 is mounted on the side outer panel 30 using the mounting clip 90. Thus, competitiveness for the design of the A-pillar portion 10 can be ensured.

Therefore, the A-pillar garnish structure 1 is configured to include the A-pillar portion 10, the vehicle-frame reinforced panel 40, the garnish 80, and the mounting clip 90.

Particularly, as illustrated in cross-sectional views in FIGS. 2A and 2B, taken along line A-A and line B-B in FIG. 1, respectively, the side outer panel 30 forms the A-pillar inner space 10-1, as a portion for welding the roof side reinforced outer panel 50 and the front inner upper panel 20 thereon. In the A-pillar inner space 10-1, the side outer panel 30 is spaced away from the roof side reinforced outer panel 50 of the vehicle-frame reinforced panel 40. Thus, a mounting clip separation space 10-2 is formed in a manner that is spaced away from the reinforced closed cross-sectional structure. In this case, fastening positions of, and the number of, the mounting clips 90 are set to be in a transverse direction of the garnish 80 in such a manner as to be consistent with positions of, and the number, respectively, of the forms 53 formed in the transverse direction in the form configuration portion 51 of the roof side reinforced outer panel 50.

In the mounting clip separation space 10-2 of the A-pillar inner space 10-1, in order to generate a fixing force, a clip hooking portion is inserted into a drilled hole in the side outer panel 30 in a state where a clip body of the mounting clip 90 is assembled on the garnish 80. Thus, the clip hooking portion is not brought into contact with the roof side reinforced outer panel 50 even in a state of protruding toward the roof side reinforced outer panel 50.

In this manner, since the mounting clip separation space 10-2 is formed in the A-pillar inner space 10-1, the mounting clip 90 in compliance with the existing specifications may be used as is. Particularly, the roof side reinforced outer panel 50 faces the mounting clip 90, but there is no need to drill a clip escape hole as before. Thus, the vehicle-frame reinforced panel 40 does not experience a decrease in its rigidity as before.

Figure 3:
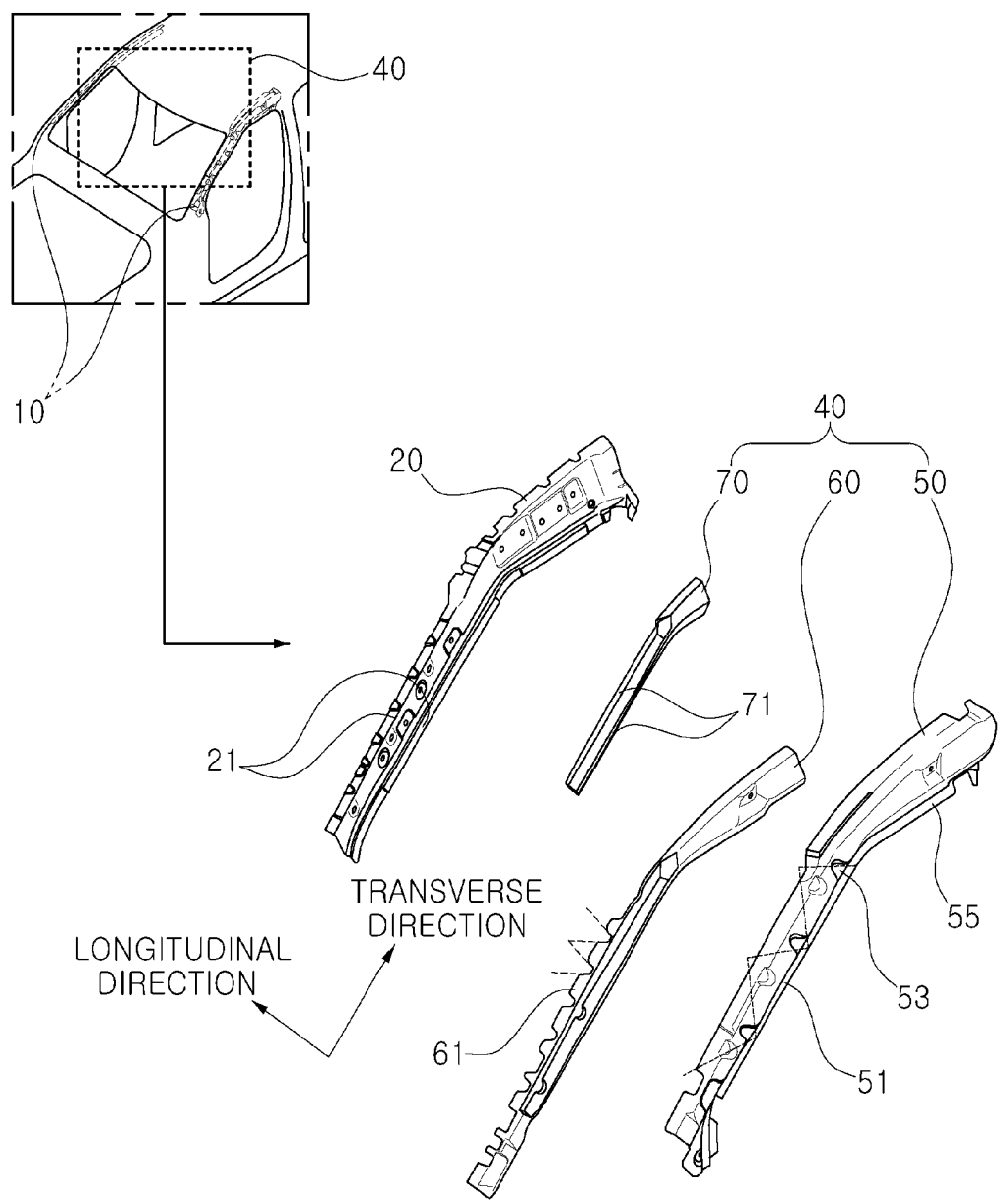
FIG. 3 is a view illustrating shapes of constituent elements of a vehicle-frame reinforced panel according to embodiments of the present disclosure.
Figure 4:
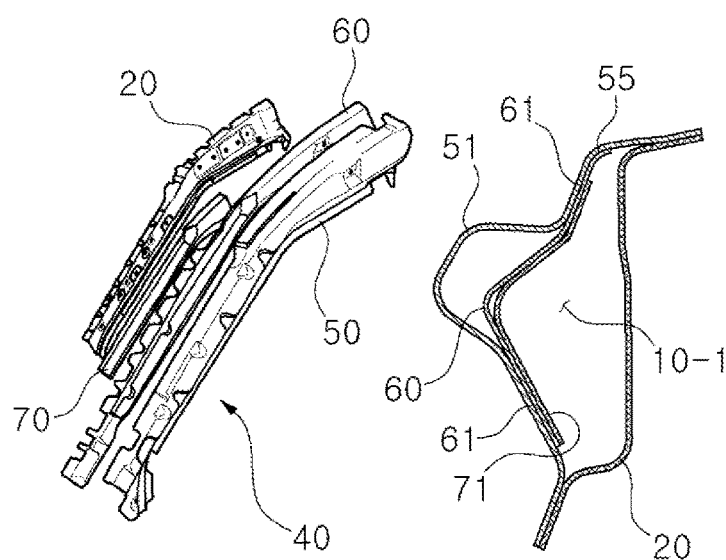
FIG. 4 is a view illustrating a vehicle-frame reinforced panel in connection with a table showing examples of values of fully plastic moment that the vehicle-frame reinforced panel according to embodiments of the present disclosure has.

FIGS. 3 and 4 illustrate a structural feature of the vehicle-frame reinforced panel 40.

With reference to FIG. 3, the roof side reinforced outer panel 50, the first roof pillar outer reinforced upper panel 60, and the second roof pillar outer reinforced upper panel 70 that comprise the vehicle-frame reinforced panel 40 have the shape and structural feature as described below.

As an example, the roof side reinforced outer panel 50 is formed to have a length in the transverse direction and a width in the longitudinal direction in a manner that corresponds to a shape of the A-pillar portion 10. Moreover, the form configuration portion 51 is formed in such a manner as to have a structure protruding from the welding flange 55 welded on respective welding portions of the front inner upper panel 20 and the side outer panel 30. Moreover, the forms 53 are formed in the shape of a groove on the form configuration portion 51 in such a manner as to press a surface of the form configuration portion 51.

Particularly, an upper surface of the form configuration portion 51 and bottom surfaces of the forms 53 form a stepped structure in the longitudinal direction of the form configuration portion 51, and thus the mounting clip separation space 10-2 is enlarged. Accordingly, an end portion of the mounting clip 90 that passes through the side outer panel 30, as illustrated in the cross-sections in FIGS. 2A and 2B, is not brought into contact with the reinforced closed cross-sectional structure.

In addition, the forms 53 are positioned in such a manner as to be inclined at angles in alternate directions and to be spaced away from each other. Thus, the forms 53 are formed in a zigzag fashion in a transverse direction of the form configuration portion 51. The forms 53 are formed in the shape of a groove in such a manner as to press the surface of the form configuration portion 51.

Therefore, the roof side reinforced outer panel 50, together with the closed cross-sectional surface formation portion 21 of the front inner upper panel 20, forms the reinforced closed cross-sectional structure. Particularly, the roof side reinforced outer panel 50 is configured to have the forms 53 that avoid a portion of the mounting clip 90 on which a garnish 80 is mounted and has a structure in which the existing clip escape hole is not present. Through the forms 53 of the form configuration portion 51, the roof side reinforced outer panel 50 is connected to the rigidity reinforcing portion 61 in the shape of the letter "W" of the first roof pillar outer reinforced upper panel 60 by being welded thereon.

As an example, the first roof pillar outer reinforced upper panel 60 is formed to have a length in the transverse direction and a width in the longitudinal direction in a manner that corresponds to a shape of the roof side reinforced outer panel 50. Moreover, the rigidity reinforcing portion 61 is formed in such a manner as to have a structure protruding in the shape of the letter "W" in the transverse direction. In this case, the first roof pillar outer reinforced upper panel 60 is formed in such a manner as to have a shorter length in the transverse direction than the roof side reinforced outer panel 50. Thus, welding is not performed on respective welding portions of the front inner upper panel 20 and the side outer panel 30.

Therefore, the shape of the letter "W" of the rigidity reinforcing portion 61, together with the forms 53 of the form configuration portion 51, form a welding portion. Thus, the first roof pillar outer reinforced upper panel 60 is connected to the form configuration portion 51 on a surface of one side of the roof side reinforced outer panel 50 by surface matching welding.

As an example, the second roof pillar outer reinforced upper panel 70 is formed to have a length in the transverse direction and a width in the longitudinal direction in a manner that corresponds to a shape of the first roof pillar outer reinforced upper panel 60. Moreover, the rigidity reinforcing cross-sectional portion 71 is formed in such a manner as to have a structure protruding in the transverse direction. In this case, the transverse direction of the second roof pillar outer reinforced upper panel 70 is formed in such a manner as to have a shorter length in the transverse direction than the first roof pillar outer reinforced upper panel 60. Thus, welding is performed only on the first roof pillar outer reinforced upper panel 60.

Therefore, the second roof pillar outer reinforced upper panel 70 is connected to the rigidity reinforcing cross-sectional portion 71 on a surface of one side of the first roof pillar outer reinforced upper panel 60 by being welded thereon. Thus, a cross section of the reinforced closed cross-sectional structure is additionally reinforced.

With reference to FIG. 4, features of a fully plastic moment of the vehicle-frame reinforced panel 40 are illustrated. When an elastic portion of a cross section is indefinitely small in an extreme state, an elastic portion of the cross section is subject to plastic compression, and a tensile portion of the cross section is subject to plastic tension. The fully plastic moment means a bending moment that occurs in this case.

As an example, it is assumed that the roof side reinforced outer panel 50 and the first and second roof pillar outer reinforced upper panels 60 and 70 are formed of the same material, have a predetermined thickness t, and have different weights, X(g), Y(g), and Z(g). Under this assumption, the experimental results show that the fully plastic moment is improved by approximately 8 to 9% although W(g) that is the sum of X(g), Y(g), and Z(g) is reduced by approximately 85 to 90% than before when compared with an existing reinforced cross-sectional structure that is mounted inside the A-pillar inner space 10-1.

Therefore, the results of the experiment with the fully plastic moment show that the A-pillar garnish structure 1 features an A-pillar garnish structure having no clip escape hole and that, with a reinforced cross-sectional structure that the vehicle-frame reinforced panel 40 realizing this feature has in the A-pillar inner space 10-1, it is possible to ensure a value of the fully plastic moment at approximately the same level as when a portion in which the clip escape hole is formed is present. Moreover, it is shown that, since an existing hole structure causing a fracture of a portion in the vicinity of the clip escape hole or noise inflow is not provided in a state where design competitiveness is ensured with the use of the A-pillar garnish, when a small overlap collision evaluation test is conducted, an NVH function, as well as a collision function, can be improved with the reinforced cross-sectional structure.

As described above, the A-pillar garnish structure 1 having no clip escape hole according to the present embodiment is provided on each of the left and right lateral sides of the vehicle. In the A-pillar garnish structure 1, the A-pillar inner space 10-1 is formed using the front inner upper panel 20 and the side outer panel 30 of the A-pillar portion 10 that connects the engine room and the roof to each other. Moreover, the mounting clip separation space 10-2 is formed between the side outer panel 30 and the reinforced closed cross-sectional structure in a state where the reinforced closed cross-section structure that is formed using the roof side reinforced outer panel 50, the first roof pillar outer reinforced upper panel 60, and the second roof pillar outer reinforced upper panel 70 is mounted inside the A-pillar inner space 10-1. Moreover, an end portion of the mounting clip 90 that passes through the side outer panel 30 and is positioned inside the mounting clip separation space 10-2 in such a manner as to fix the garnish 80 is positioned over the forms 53 that have a lower height than the form configuration portion 51 of the roof side reinforced outer panel 50 and thus is kept from being in contact with the reinforced closed cross-sectional structure.

Therefore, the A-pillar garnish structure 1 has a feature in that it does not have the clip escape hole. Since the clip escape hole is not provided, the rigidity of the panel can be maintained in a state where design competitiveness is ensured with the garnish 80. Thus, a collusion safety function can be ensured, thereby satisfying the small overlap collision evaluation test. Particularly, the vehicle-frame reinforced panel 40 has the shape of the letter "W," and thus, there is no need to drill the clip escape hole. Accordingly, the value of the fully plastic moment at approximately the same level as when the portion in which the clip escape hole is formed is present can be ensured, and the weight of the A-pillar garnish structure and the cost thereof can be reduced.

As described above, embodiments of the present disclosure have been described with reference to the exemplary drawings, but the present disclosure is not limited to the described embodiments, and it is apparent to those skilled in the art that the present disclosure may be variously modified and changed without departing from the spirit and scope of the present disclosure. Accordingly, the modified examples or changed examples should belong to the claims of the present disclosure, and the scope of the present disclosure should be construed based on the appended claims.

What is claimed is:

1. An A-pillar garnish structure comprising:
  an A-pillar portion defining an A-pillar inner space using a front inner upper panel and a side outer panel;

a garnish fixed to the side outer panel using a mounting clip passing through the side outer panel, wherein the garnish is configured to provide a design of an exterior appearance of the A-pillar portion; and a vehicle-frame reinforced panel defining a mounting clip separation space together with the side outer panel of the A-pillar portion in such a manner as to have a closed cross-section structure, wherein the mounting clip does not contact the vehicle-frame reinforced panel and wherein the vehicle-frame reinforced panel comprises a roof side reinforced outer panel that comprises a form configuration portion protruding from a welding flange and a form having a groove shape provided on the form configuration portion.

2. The A-pillar garnish structure of claim 1, wherein respective cross sections in a longitudinal direction of the form configuration portion and the form define a stepped structure in which the mounting clip separation space is enlarged.

3. The A-pillar garnish structure of claim 1, further comprising a plurality of the forms arranged in a zigzag fashion in a transverse direction of the form configuration portion.

4. The A-pillar garnish structure of claim 1, further comprising:
a first roof pillar outer reinforced upper panel coupled to the roof side reinforced outer panel; and
a rigidity reinforcing portion provided on the first roof pillar outer reinforced upper panel.

5. The A-pillar garnish structure of claim 4, wherein the rigidity reinforcing portion is connected to the form configuration portion by a surface matching weld.

6. The A-pillar garnish structure of claim 5, wherein the surface matching weld is on the form in a state in which the rigidity reinforcing portion is surface-matched with the form configuration portion.

7. The A-pillar garnish structure of claim 6, wherein a part of the rigidity reinforcing portion that is welded on the form has a "W" shape.

8. The A-pillar garnish structure of claim 4, wherein the first roof pillar outer reinforced upper panel has a shorter length than the roof side reinforced outer panel.

9. An A-pillar garnish structure comprising:
an A-pillar portion defining an A-pillar inner space using a front inner upper panel and a side outer panel;
a garnish fixed to the side outer panel using a mounting clip passing through the side outer panel, wherein the garnish is configured to provide a design of an exterior appearance of the A-pillar portion;
a vehicle-frame reinforced panel defining a mounting clip separation space together with the side outer panel of the A-pillar portion in such a manner as to have a closed cross-section structure, wherein the mounting clip does not contact the vehicle-frame reinforced panel and wherein the vehicle-frame reinforced panel comprises a roof side reinforced outer panel that comprises a form configuration portion protruding from a welding flange and a form having a groove shape provided on the form configuration portion;
a first roof pillar outer reinforced upper panel coupled to the roof side reinforced outer panel;
a rigidity reinforcing portion provided on the first roof pillar outer reinforced upper panel;
a second roof pillar outer reinforced upper panel coupled to the first roof pillar outer reinforced upper panel; and a rigidity reinforcing cross-sectional portion provided on the second roof pillar outer reinforced upper panel.

10. The A-pillar garnish structure of claim 9, wherein the rigidity reinforcing cross-sectional portion is connected by a weld.

11. The A-pillar garnish structure of claim 9, wherein the rigidity reinforcing cross-sectional portion is configured to additionally reinforce a cross section of the rigidity reinforcing portion of the first roof pillar outer reinforced upper panel.

12. The A-pillar garnish structure of claim 9, wherein the second roof pillar outer reinforced upper panel has a shorter length than the first roof pillar outer reinforced upper panel.

13. The A-pillar garnish structure of claim 9, wherein the rigidity reinforcing portion is connected to the form configuration portion by a surface matching weld.

14. The A-pillar garnish structure of claim 9, wherein the first roof pillar outer reinforced upper panel has a shorter length than the roof side reinforced outer panel.

15. A vehicle comprising:
a vehicle body comprising an engine room and a roof; and
A-pillar garnish structures connecting the engine room and the roof to each other on a left side and a right side of the vehicle, respectively, wherein each of the A-pillar garnish structures comprises:
an A-pillar portion defining an A-pillar inner space using a front inner upper panel and a side outer panel;
a garnish fixed to the side outer panel using a mounting clip passing through the side outer panel, wherein the garnish is configured to provide a design of an exterior appearance of the A-pillar portion; and
a vehicle-frame reinforced panel defining a mounting clip separation space together with the side outer panel of the A-pillar portion in such a manner as to have a closed cross-section structure, wherein the mounting clip does not contact the vehicle-frame reinforced panel and wherein the vehicle-frame reinforced panel comprises a roof side reinforced outer panel that comprises a form configuration portion protruding from a welding flange and a form having a groove shape provided on the form configuration portion.

16. The vehicle of claim 15, wherein the form comprises a plurality of forms arranged in a zigzag fashion in a transverse direction of the form configuration portion, and wherein each of the forms has a groove shape.

17. The vehicle of claim 15, further comprising:
a first roof pillar outer reinforced upper panel coupled to the roof side reinforced outer panel; and
a rigidity reinforcing portion provided on the first roof pillar outer reinforced upper panel.

18. The vehicle of claim 17, wherein a part of the rigidity reinforcing portion has a "W" shape.

19. The vehicle of claim 17, wherein the first roof pillar outer reinforced upper panel has a shorter length than the roof side reinforced outer panel.

20. The vehicle of claim 17, further comprising:
a second roof pillar outer reinforced upper panel coupled to the first roof pillar outer reinforced upper panel, wherein the second roof pillar outer reinforced upper panel has a shorter length than the first roof pillar outer reinforced upper panel; and
a rigidity reinforcing cross-sectional portion provided on the second roof pillar outer reinforced upper panel.

* * * * *